3,427,681
HINGES FOR OPHTHALMIC MOUNTINGS AND THE LIKE
Morris G. Smith, Jr., Berkeley Heights, N.J., assignor, by mesne assignments, to Amerace Esna Corporation, New York, N.Y., a corporation of Delaware
Filed Mar. 14, 1967, Ser. No. 623,121
U.S. Cl. 16—128     12 Claims
Int. Cl. G02c 5/22, 5/16; E05d 11/00

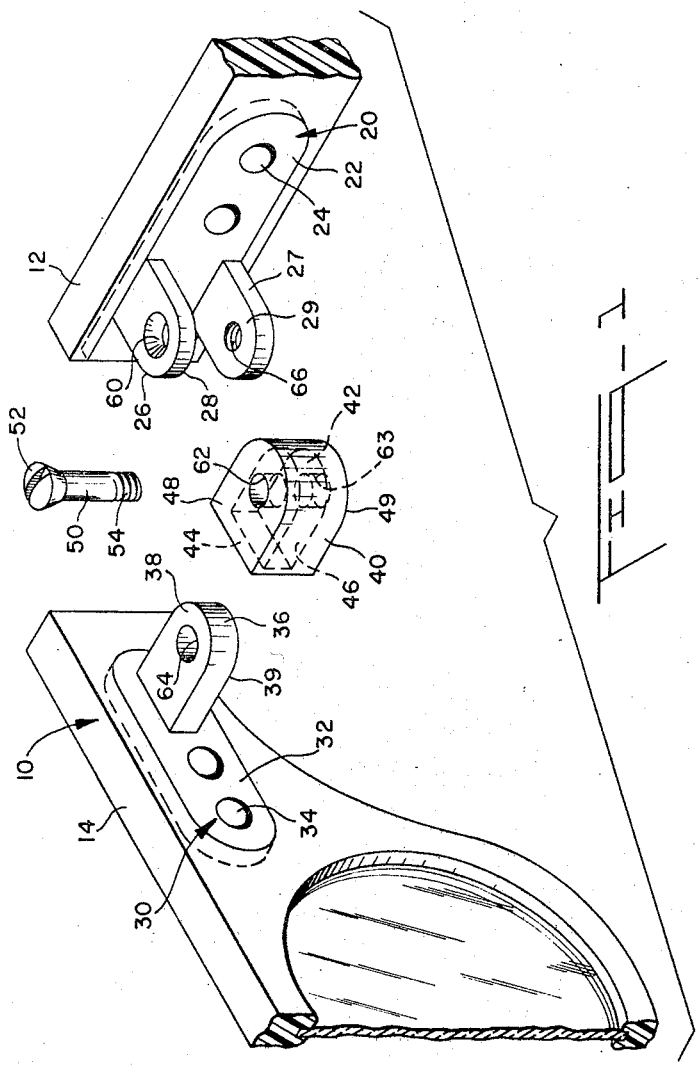

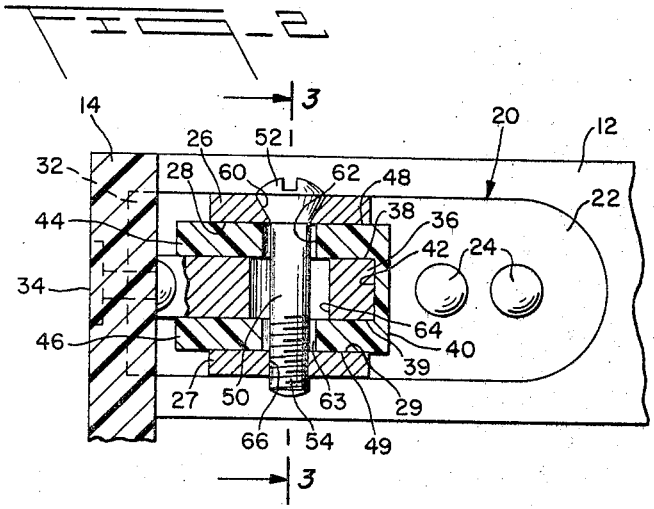
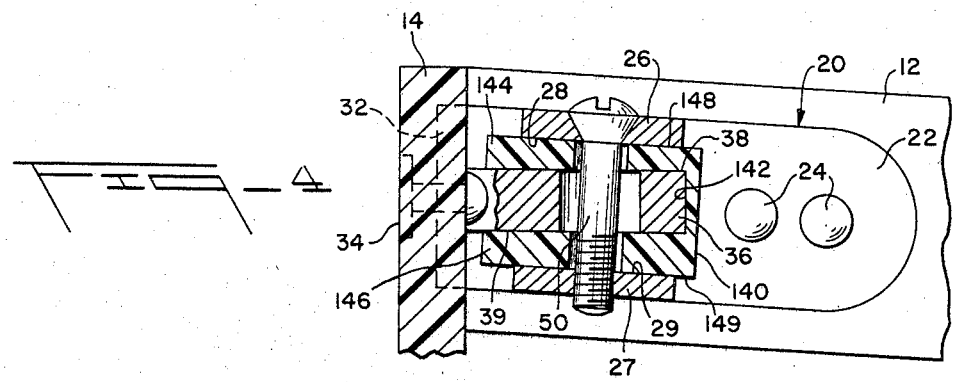
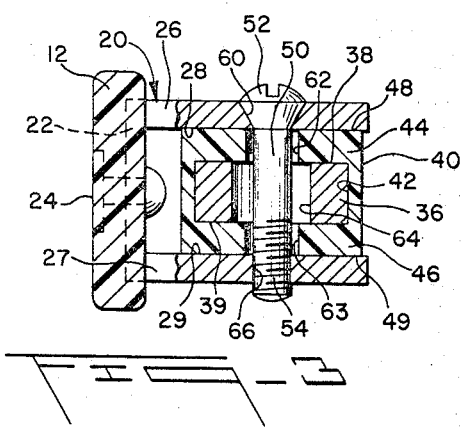
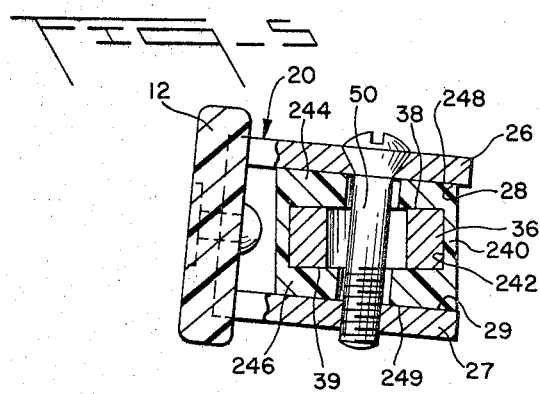
INVENTOR.
MORRIS G. SMITH, JR.
BY
*Samuelson & Jacob*
HIS ATTORNEYS United States Patent Office 3,427,681
Patented Feb. 18, 1969

ABSTRACT OF THE DISCLOSURE

A hinge for connecting a temple to the front frame of an ophthalmic mounting wherein the interleaved barrels of the hinge have spaced apart confronting faces movable relative to one another and a unitary boot of nylon is placed over at least one interleaved barrel of the hinge to establish nylon walls lying between the relatively movable spaced confronting faces of the interleaved barrels.

---

The present invention relates generally to improvements in ophthalmic mountings and the like and pertains more specifically to a novel hinge for connecting temples to the front frame of eyeglasses, spectacles, sunglasses, safety frames and like articles.

Hinges employed in ophthalmic mountings are, of necessity, rather small and yet must be made to withstand rigorous service over long periods of time without failure or undue wear. Among the most common complaints of those who wear eyeglasses are uncontrolled "drop" or movement of the temples in opening or closing of the eyeglass assembly and loss of the pintle, which is generally in the form of a machine screw, holding the hinge parts together. The former complaint may arise as a result of poor manufacturing tolerances, excessive wear or loosening of the pintle while the latter complaint is generally occasioned by the desirability of having a removable pintle and the failure to provide adequate means for securing the removable pintle in place.

At the same time, the optician, optometrist or "dispenser" of eyeglasses is interested in ease of assembly and adjustment of eyeglass frame assemblies and especially the hinge of such assemblies.

It is therefore an important object of the invention to provide a hinge for ophthalmic mountings which will be strong enough and rugged enough to withstand rigorous use over long periods of time without excessive wear or failure and which will provide controlled movement in both the opening and closing of the temple of the mounting.

Another object of the invention is to provide an eyeglass hinge employing a pintle which is selectively removable but which will not become readily disengaged inadvertently.

A further object of the invention is to provide ophthalmic mountings having hinges which are readily adjustable to enable ease in varying either the pantoscopic angle or the cut-off angle of the mounting provided by the hinge or both angles.

A still further object of the invention is to provide eyeglas hinges which may be manufactured economically and in which the requirement for certain close manufacturing tolerances is reduced.

The above objects as well as further objects and advantages are attained by the invention which may be described briefly as an improvement in a hinge for connecting a temple to a front frame part of an ophthalmic mounting, the hinge being of the type having interleaved barrels establishing confronting faces which move relative to one another during operation of the hinge, the improvement comprising unitary means fitted over at least one barrel of the hinge and including at least one wall of resilient plastic material fitted snugly between the confronting faces.

The invention will be more fully understood and additional objects and advantages will become apparent in the following detailed description of an embodiment of the invention illustrated in the accompanying drawing, in which:

FIGURE 1 is an exploded perspective view illustrating a hinge constructed in accordance with the invention with the component parts installed on a temple and on the front frame of an eyeglass assembly;

FIGURE 2 is a partially sectioned side elevational view of the hinge shown joining a temple with the front frame of an eyeglass assembly;

FIGURE 3 is a cross-sectional view taken along line 3—3 of FIGURE 2;

FIGURE 4 is a partially sectioned side elevational view similar to FIGURE 2 but illustrating an alternative form of the hinge; and FIGURE 5 is a partially sectioned end elevational view illustrating still another alternative form of the hinge.

Referring now to the drawing and especially to FIGURE 1, an ophthalmic mounting is shown in the form of an eyeglass frame 10 having a temple 12 and a front frame 14 which are to be joined together by a hinge constructed in accordance with the invention. The hinge has a first portion in the form of a temple portion or member 20 which includes a base 22 affixed to the temple 12 by means of a rivet assembly 24 and two barrels 26 and 27 projecting generally perpendicular to the base 22 and having opposed faces 28 and 29 spaced apart so as to receive further component parts of the hinge between the barrels 26 and 27. A second portion shown in the form of front portion or member 30 of the hinge includes a base 32 affixed to the front frame 14 by means of a rivet assembly 34 and a single barrel 36 projecting from the base 32 and having opposite faces 38 and 39 spaced apart a distance less than the distance between corresponding faces 28 and 29 of the temple member 20.

A unitary member of resilient plastic material is shown in the form of a boot 40 having a cavity 42 for telescopically receiving the barrel 36 of the front hinge member 30 and opposite walls 44 and 46 having outer surfaces 48 and 49, respectively.

A pintle is shown in the form of a machine screw 50 having a head 52 at one end thereof and a threaded portion 54 at the other end.

In order to assemble the temple 12 with the front frame 14, the boot 40 is slipped over the barrel 36 of the front hinge member 30 and the assembled boot 40 and barrel 36 are placed between the barrels 26 and 27 of the temple hinge member 20 in order to interleave the hinge portions as seen in FIGURES 2 and 3. The screw 50 is then inserted into the axially aligned apertures 60, 62, 63 and 64 in the interleaved barrel 26, walls of boot 40 and barrel 36, respectively, and the threaded portion 54 of the screw 50 is threaded into a corresponding threaded aperture 66 in the barrel 27 of the temple hinge member 20. The screw 50 may then be tightened until the head 52 thereof comes into contact with the upper barrel 26 and urges the upper and lower barrels 26 and 27 toward one another against the walls 44 and 46 of the resilient plastic boot 40, thereby establishing a compressive stress in the walls 44 and 46. The resulting tension in the screw 50 will increase the force of the frictional engagement between the head 52 and the upper barrel 26 and between the threaded portion 54 and the corresponding threaded aperture 66 in the lower barrel 27 to secure the screw 50 in place in the assembled hinge so that the screw 50 will resist loosening and the concomitant eventual drop-out of the screw which is so prevalent in ordinary eyeglass hinge constructions will be precluded.

The hinge construction of the invention allows the temple hinge member 20 and the front hinge member 30, as well as the screw 50, to be fabricated of metal and hence provides an exceedingly strong and sturdy construction. However, since the wall 44 of the boot lies between the confronting pair of faces 28 and 38 and the wall 46 lies between the confronting pair of faces 29 and 39, there is no metal-to-metal contact between those surfaces which move relative to one another. To this end, it is noted that the apertures 62 and 63 in the walls 44 and 46 are smaller in diameter than the aperture 64 in barrel 36 so that even the shank of screw 50, which rotates with the movement of temple hinge member 20, will be spaced from the walls of the aperture 64. Thus, wear is reduced and controlled drop or movement in opening and closing of the temple is achieved. Such movement is smoother and more even as a result of the low coefficient of friction of the plastic and will remain so over a relatively long period of time. In addition, the presence of boot 40 allows a greater latitude in manufacturing tolerances since the resilience of the material of the boot can take up any play between the barrels of the hinge. Furthermore, the materials chosen for the hinge members need no longer be restricted to special metals or other materials which would ordinarily be required to withstand wear due to friction between the relatively moving surfaces of the hinge members since metal-to-metal contact is eliminated.

The boot 40 is fabricated in a unitary structure making it easy to handle during either initial assembly or subsequent replacement. A variety of resilient plastic materials suitable for the fabrication of the boot will become apparent to those skilled in the art of materials. Among such suitable materials are such synthetic resins as the acetal resins, polycarbonates, fluorocarbons, and polyamide resins. Of these materials, it has been found that the polyamide resins, or nylons, having the necessary mechanical qualities as well as being readily available and easily molded into the desired configuration for boot 40.

Turning now to FIGURES 2, 3 and 4, it will be seen that the pantoscopic angle of the opthalmic mounting, which is the angle made between the plane of the front frame of the eyeglass frame and a vertical line, may be changed at will by merely replacing the boot 40 with an alternative boot 140 having a cavity 142 and walls 144 and 146 whose outer faces 148 and 149 now make an angle with the longitudinal alignment of the cavity 142 therein and hence will change the angular relationship between the confronting pairs of faces 28, 38, and 39, 29 of the respective barrels 26, 36 and 27 and hence the angle between the temple 12 and the front frame 14. Thus, whereas in the configuration of FIGURE 2, the confronting faces 28 and 38 of the barrels 26 and 36 and the confronting faces 39 and 29 of the barrels 36 and 27 all lie in parallel planes and the walls 44 and 46 of the boot 40 are of uniform thickness, the confronting faces in the configuration of FIGURE 4 lie in planes making an angle with one another by virtue of the unequal or non-uniform thickness of the walls 144 and 146 of the boot 140. Hence a dispenser of eyeglasses need merely change the boot without making any changes to any other component parts of the hinge to effect a change in the pantoscopic angle of the eyeglass frame assembly. Since the boot is easy to handle, adjustments of the angle may be made with ease.

As best seen in FIGURE 5, the cut-off angle of the ophthalmic mounting, which is the angle between the plane in which the barrel or barrels of one of the hinge members lies and the center line of the base of the other hinge member, may be varied by varying the thickness of the walls of the boot in a direction perpendicular to the direction of variation illustrated in FIGURE 4. Thus, boot 240 has a cavity 242 and walls 244 and 246 providing surfaces 248 and 249 which lie at an angle to the lateral alignment of the cavity 242 so that the boot estbalishes an angle between the confronting faces 28 and 38 and between the confronting faces 39 and 29. Hence, whereas in the configuration of FIGURE 3 the confronting faces of the barrels all lie in parallel planes, in the configuration of FIGURE 5 the confronting faces lie in planes making an angle with one another and the thickness of walls 244 and 246 varies to accommodate another cut-off angle.

It will be apparent that the above described construction in which a boot is slipped over a barrel in order to establish walls of resilient plastic material between the relatively moving surfaces of a multi-barreled hinge is equally applicable to hinges having either a greater or lesser number of barrels than the three-barrel hinge illustrated in the above described example. Thus, in a five-barrel hinge wherein one hinge member has two barrels and the other hinge member has three barrels, two separate boots may be slipped over the two barrels of the two-barreled hinge member to establish walls of resilient plastic material between all of the relatively movable surfaces of the five-barrel hinge. Those hinges which have a sufficient number of barrels to require more than one boot may employ a unitary molded boot having more than one cavity and more than two walls so as to reduce the total number of individual components in such multi-barreled hinges.

It is to be understood that the above detailed description of an embodiment of the invention is provided by way of example only. Various details of design and construction may be modified without departing from the true spirit and scope of the invention as defined in the appended claims.

The embodiments of the invention in which an exclusive property or privilege is claimed are defined as follows:

1. In a hinge for connecting a temple to a front frame part of an ophthalmic mounting, the hinge being of the type having interleaved barrels establishing confronting faces which move relative to one another during operation of the hinge, unitary means fitted over at least one barrel of the hinge and including at least one wall of resilient plastic material fitted snugly between said confronting faces.

2. The improvement of claim 1 wherein the unitary means comprises a boot of resilient plastic material having a cavity for receiving said one barrel such that the boot is fitted snugly over said one barrel.

3. The improvement of claim 2 wherein the resilient plastic material is nylon.

4. The improvement of claim 1 wherein the confronting faces lie in parallel planes which are spaced from one another and the thickness of the wall of plastic material between the faces is uniform to preserve the parallel relationship of the confronting pair of faces.

5. The improvement of claim 1 wherein the confronting faces lie in planes which are at an angle to one another and the thickness of the wall of plastic material between the faces is non-uniform to follow and preserve the varying spacing between said confronting faces.

6. A hinge for connecting a temple to the front frame part of an ophthalmic mounting and employing the improvement of claim 1, said hinge comprising:

a first hinge portion having at least two barrels establishing opposed faces spaced axially from one another;

a second hinge portion having at least one barrel with opposite faces and lying between the two barrels of the first hinge portion and spaced therefrom such that each opposite face of the second hinge portion confronts a corresponding opposed face of the first hinge portion to establish pairs of faces confronting and spaced axially from one another;

said unitary means including at least a portion of plastic material lying between the two barrels of the first hinge portion to present a wall of resilient plastic material fitting snugly between each confronting pair of faces; and a pintle passing generally axially through the barrels of the first and second hinge portions and through the walls of plastic material.

7. The hinge of claim 6 wherein the faces of a confronting pair of faces lie in parallel planes which are spaced from one another and the thickness of the wall of plastic material between the faces is uniform to preserve the parallel relationship of the confronting pair of faces.

8. The hinge of claim 6 wherein the faces of a confronting pair of faces lie in planes which are at an angle to one another and the thickness of the wall of plastic material between the faces is non-uniform to follow and preserve the varying spacing between said confronting faces.

9. The hinge of claim 6 wherein:
the first hinge portion is a temple hinge member;
the second hinge portion is a front hinge member;
the unitary means comprises a unitary boot of resilient plastic material having a cavity for receiving the one barrel of the front hinge member such that the boot is fitted snugly over said one barrel.

10. The hinge of claim 9 wherein the resilient plastic material is nylon.

11. The hinge of claim 9 wherein said pintle engages at least the two barrels of the temple hinge member and exerts a force tending to draw the confronting faces toward one another and placing compressive stress upon the walls of plastic material fitted between the confronting faces.

12. The hinge of claim 11 wherein the pintle has a head portion engaging one of the barrels of the temple hinge member and a threaded portion engaging a corresponding threaded portion in the other barrel of the temple hinge member.

References Cited
UNITED STATES PATENTS

| | | | |
|---|---|---|---|
| 2,828,668 | 4/1958 | De Angelis | 16—128 |
| 2,939,168 | 6/1960 | Ferron | 16—128 |

JAMES T. McCALL, *Primary Examiner.*

D. L. TROUTMAN, *Assistant Examiner.*

U.S. Cl. X.R.

16—148; 351—141